(12) United States Patent
Harvey et al.

(10) Patent No.: US 6,750,293 B2
(45) Date of Patent: Jun. 15, 2004

(54) HIGH-STRENGTH RUBBER FORMULATIONS, AND SHEAR PLY MADE FROM THE SAME

(75) Inventors: Albert R. Harvey, Brigham City, UT (US); John W. Ellertson, Brigham City, UT (US)

(73) Assignee: Alliant Techsystems, Inc., Edina, MN (US)

( * ) Notice: Subject to any disclaimer, the term of this patent is extended or adjusted under 35 U.S.C. 154(b) by 0 days.

(21) Appl. No.: 10/107,594

(22) Filed: Mar. 27, 2002

(65) Prior Publication Data

US 2002/0193524 A1 Dec. 19, 2002

Related U.S. Application Data

(60) Provisional application No. 60/279,560, filed on Mar. 29, 2001.

(51) Int. Cl.$^7$ .............. C08L 9/00; C08L 9/02; C08L 33/18; C08L 47/00; C08F 136/00
(52) U.S. Cl. ......... 525/197; 525/198; 525/232; 525/233; 525/238; 526/335; 526/337; 526/341; 526/342; 526/938
(58) Field of Search .................. 525/197, 198, 525/232, 233, 238; 526/335, 337, 341, 342, 938

(56) References Cited

U.S. PATENT DOCUMENTS

| 4,983,678 A | * | 1/1991 | Saito et al. .................. 525/193 |
| 5,246,994 A | | 9/1993 | Shibahara et al. |
| 5,312,869 A | * | 5/1994 | Nomura et al. .............. 525/193 |
| 5,370,915 A | | 12/1994 | Hirakawa |
| 5,731,371 A | | 3/1998 | Nesbitt et al. |
| 5,756,586 A | | 5/1998 | Nishimura et al. |
| 6,153,686 A | | 11/2000 | Granatowicz et al. |

FOREIGN PATENT DOCUMENTS

| EP | 0557907 A1 | 9/1993 |
| EP | 0890610 A1 | 1/1999 |
| WO | WO 0104198 A1 | 1/2001 |

OTHER PUBLICATIONS

Klingender, et al., High Strength Compound of HSN and its Applications, presented at 135th Meeting of Rubber Division, American Chemical Society, Mexico City, Mexico (1989).

European Search Report, dated Aug. 5, 2003.

* cited by examiner

*Primary Examiner*—Nathan M. Nutter
(74) *Attorney, Agent, or Firm*—TraskBritt

(57) ABSTRACT

Disclosed are a precursor composition, a rubber component and a shear ply prepared from the precursor composition, and methods for making and using the same. The precursor composition includes a first hydrogenated nitrile conjugated-diene copolymer modified by a metal salt unsaturated carboxylic acid ester, wherein the first hydrogenated nitrile conjugated-diene copolymer is derived from a first ethylenically unsaturated nitrile and a first conjugated diene a second hydrogenated nitrile conjugated-diene copolymer derived from a second ethylenically unsaturated nitrile and a second conjugated diene; and a curing agent.

21 Claims, 2 Drawing Sheets

HIGH-STRENGTH RUBBER FORMULATIONS, AND SHEAR PLY MADE FROM THE SAME

RELATED APPLICATION

This application claims the benefit of priority of provisional patent application No. 60/279,560 filed in the U.S. Patent & Trademark Office on Mar. 29, 2001, the complete disclosure of which is incorporated herein by reference.

BACKGROUND OF THE INVENTION

1. Field of the Invention

The present invention pertains to the field of high strength elastomers. More particularly, the present invention pertains to high strength elastomers suited for use in high temperature shear ply applications, such as for transferring loads from the pressure vessel of either a stand-alone composite rocket motor or strap-on composite booster to a rocket skirt.

2. Description of Related Art

Although there are many variations to the configuration and construction of a rocket motor, rocket motors generally comprise an outer motor casing for housing an energetic fuel or propellant. In the case of a solid rocket motor, the outer motor casing houses a solid propellant formulated to undergo combustion while contributing to the production of adequate thrust for attaining propulsion of the rocket motor. Other types of rocket motors, such as hybrid, reverse-hybrid motors, and bi-liquid motors, make use of a liquid oxidizer and/or liquid fuel. A rubber insulation layer and a liner positioned between the casing and the propellant serve to protect the rocket motor casing from high temperature combustion products generated as the propellant burns.

Rocket motor casings are generally made of metal, a composite material, or a combination of metal and composite materials. Composite materials are typically prepared by winding a resin-impregnated fiber on a mandrel to shape the rocket motor casing. The resin may be a curable resin, and is normally either an epoxy or phenolic resin. The fibers are usually carbon graphite fibers or aramid fibers.

The aft end portion of the rocket motor casing is directed to a rocket skirt. Typically, an outer surface portion of a composite rocket motor casing is covered with a shear ply layer for coupling the rocket motor casing to the skirt. High strength rubber compositions are often used for the forming shear ply layers that connect the rocket skirt with the composite rocket motor casing.

Silica-filled nitrile polybutadiene rubber (NBR) compositions are presently used to form shear ply layers that connect a rocket skirt with a stand-alone composite rocket motor casing. The conventional NBR compositions have been found generally to exhibit a tensile strength and ultimate elongation on the order of 20,684 kPa (3000 psi) and 700 percent, respectively. Although these properties are adequate for stand-alone motor applications, new developments in rocketry call for the use of strap-on boosters across a wide temperature range. The strap-on design imparts higher loads to the shear ply than a stand-alone rocket motor. These higher load designs encountered in strap-on booster applications have created a perceived need for a novel shear ply material that possesses a higher tensile strength and improved high temperature properties compared to conventional silica-filled NBR compositions.

OBJECTS OF THE INVENTION

It is therefore one of the objects of this invention to provide a precursor composition that, upon curing, forms a high strength rubber that can have sufficient flexion, strength, and high temperature properties for use, by way of example, in a shear ply for rocketry applications.

Another object of the invention is to provide a rubber material that may have sufficient flexion, strength, and high temperature properties for use in a shear ply for rocketry applications. It is especially preferred by this object that the rubber material have a tensile strength and ultimate elongation that are sufficient for the intended preferred application of a shear ply.

It is another object of this invention to provide a rocket motor assembly comprising a shear ply constructed and arranged for transferring loads between a coupled casing and skirt of the rocket motor assembly.

Yet another object of the invention is to provide corresponding methods for making the high strength rubber material from the precursor composition, as well as methods of making and applying shear ply articles using the high strength rubber composition.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, according to one aspect of this invention there is provided a precursor composition that is curable into a rubber component and comprises:

(a) a first hydrogenated nitrile conjugated-diene copolymer modified by a metal salt unsaturated carboxylic acid ester, wherein the hydrogenated nitrile conjugated-diene copolymer is derived from a first composition comprising a first ethylenically unsaturated nitrile and a first conjugated diene;

(b) a second hydrogenated nitrile conjugated-diene copolymer derived from a second composition comprising a second ethylenically unsaturated nitrile and a second conjugated diene; and (c) a curing agent, wherein (a) and (b) are intermixed.

In accordance with another aspect of this invention, there is provided a rubber component formed from the precursor composition.

In accordance with still another aspect of this invention, a method is provided in which components (a) and (b) of the precursor composition are mixed together to form a blend, and the blend is cured with a curing agent, such as a peroxide curing agent, to form the rubber component.

In accordance with a further aspect of this invention, there is provided a method for coupling a skirt to a composite rocket motor case of a rocket motor engine. This aspect of the invention involves providing a rubber shear ply comprising the rubber component of this invention, and interposing the rubber shear ply between a skirt and a composite rocket motor case of a rocket motor assembly.

The present invention overcomes the problems that are outlined above, addresses the above and other objects, and advances the art by providing a high strength rubber composition having improved strength across a broad temperature range for use in various applications. These applications include, but are not limited to, rocketry applications, especially in the context of forming shear ply layers. As used herein, the term "rubber" is defined to encompass both synthetic and natural elastomers. The rubber composition, in its various embodiments and methodologies, can facilitate the use of stronger rocket motors, as well as new types of motors.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DESCRIPTION OF THE PREFERRED EMBODIMENTS AND METHODS OF THE INVENTION

Figure 1:
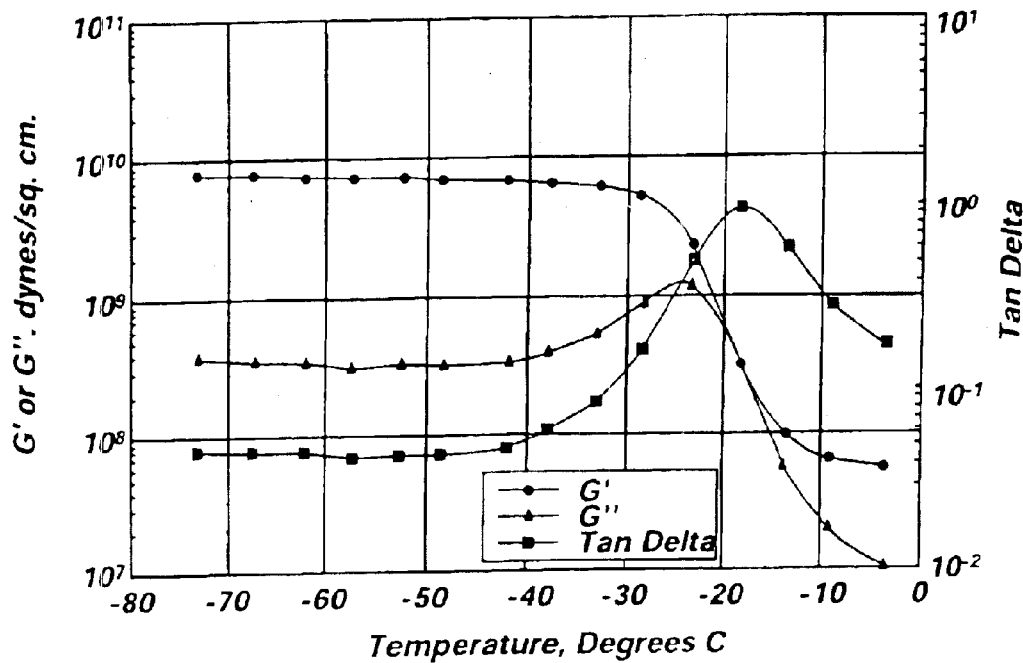
FIG. 1 is a graph depicting spectrophotometrically estimated temperature dependant dynamic mechanical properties of a presently preferred rubber composition illustrating the present invention.

Reference will now be made in detail to the presently preferred embodiments and methods of the invention as elaborated upon by the accompanying drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

The precursor composition according to an embodiment of this invention comprises a first hydrogenated nitrile conjugated-diene copolymer modified by a metal salt unsaturated carboxylic acid ester, and a second hydrogenated nitrile conjugated-diene copolymer not modified with the metal salt unsaturated carboxylic acid ester. Each of the hydrogenated nitrile conjugated-diene copolymers is derived from a respective composition comprising at least one respective ethylenically unsaturated nitrile and at least one respective conjugated diene. The ethylenically unsaturated nitrites of the first and second hydrogenated nitrile conjugated-diene copolymers may be the same or different. Representative ethylenically unsaturated nitrites are acrylonitrile and methacrylonitrile, with acrylonitrile currently being preferred. As referred to herein, ethylenically unsaturated means the presence of at least one carbon-carbon double bond.

The conjugated dienes of the first and second hydrogenated nitrile conjugated-diene copolymers may be the same or different. Representative conjugated dienes for use in this invention include, for example, one or more members selected from the group consisting of butadiene, isoprene, dimethylbutadiene, 1,3-pentadiene, and piperylene. Of these, butadiene is currently preferred.

The metal salt unsaturated carboxylic acid ester is derived from an ethylenically unsaturated carboxylic acid, which is preferably an $\alpha,\beta$-ethylenically unsaturated carboxylic acid having at least one carboxyl group. The ethylenically unsaturated carboxylic acid may comprise at least one unsaturated monocarboxylic acid selected from the group consisting of acrylic acid, methacrylic acid, crotonic acid, and 3-butenic acid. Alternatively, the ethylenically unsaturated carboxylic acid may comprise at least one unsaturated dicarboxylic acid selected from the group consisting of maleic acid, fumaric acid, and itaconic acid. It is also possible to use combinations of monocarboxylic and dicarboxylic acids.

Representative metals for the metal salt unsaturated carboxylic acid ester include zinc, magnesium, calcium, and aluminum, and combinations thereof. The metal salt unsaturated carboxylic acid ester may be derived from a metallic compound, such as a metal oxide, especially zinc oxide. The currently preferred metal salt unsaturated carboxylic acid ester comprises zinc dimethacrylate.

According to one example of the invention, the weight ratio of component (a) to component (b) in the precursor composition may be in a range of 85:15 to 30:70.

The amount and type of curing agent demonstrates appreciable effects upon the strength of the finished rubber composition. For example, a peroxide curing agent may constitute from 1 weight percent to 2 weight percent of the total weight of the precursor composition. The curing agent is preferably dispersed in a clay or other carrier that itself comprises from 1 weight percent to 3 weight percent of the total weight of the precursor composition. The peroxide curing agent is typically heated to an activation temperature whereupon the agent cleaves at the peroxide to form a pair of free-radicals that initiate the polymerization reaction. An especially preferred peroxide curing agent is 2,2'-bis(t-butylperoxy)diisopropyl benzene, which is preferably heated to an activation temperature of about 149° C. (300° F.) to 160° C. (320° F.) to initiate polymerization. Other conventional peroxide curing agents may be used to initiate at different temperatures as a matter of design choice. Alternatively, other initiators, e.g., nitrobenzyl photoinitiators, may be used to initiate polymerization.

In addition to providing a finished rubber composition having excellent mechanical properties, the precursor has various rheological properties that facilitate related manufacturing processes using the precursor. Various precursor formulations that are described above have demonstrated the following rheological properties:

a Mooney viscosity ranging between 60 and 80 determined as ML1 +4 at 100° C. (212° F.), a TS2 ranging between 3.0 and 4.5 minutes determined by oscillating disk rheometer at 160° C. (320° F.) over a 5° arc, a minimum torque (ML) ranging from 0.45 to 1.13 N·m (4.0 to 10.0 in-lb) determined by oscillating disk rheometer at 160° C. (320° F.) over a 5° arc, a maximum torque (MH) after 2 hours ranging between 4.5 to 7.9 N·m (40 and 70 in-lb), an Mc(90) ranging between 4.0 to 6.8 N·m (35 and 60 in-lb) determined by oscillating disk rheometer at 160° C. (320° F.) over a 5° arc, and a tc(90) ranging from 20 and 45 minutes determined by oscillating disk rheometer at 160° C. (320° F.) over a 5° arc.

Preferred precursors also contain an antioxidant in an amount ranging from 2 weight percent to 3 weight percent of the total weight of the precursor composition. The antioxidant preferably comprises an amine, and is most preferably selected from the group consisting of di-n-butylamine and phenyl-β-naphylamine. An imidazole antioxidant may be used in synergistic combination with the amine antioxidant, and the imidazole preferably comprises zinc 2-percaptotoluolimidazole.

In its further aspects, the invention pertains to a cured rubber composition that is derived from the precursor. According to the broad ranges of ingredient weight percentages that are described above, the rubber composition may be formulated to provide an average shear strength in the finished rubber product greater than 17,237 kPa (2500 psi) when tested between 21° C. (70° F.) and 38° C. (100° F.) by single-lap shear specimens of structural rubber bonded to a graphite/fiber epoxy composite with a cross head rate of 0.051 cm/min (0.02 in/min). The 17,237 kPa (2500 psi) shear strength is approximately equal to the shear strength that is obtainable from the best silica-filled compositions available in the prior art. Even so, the shear strength is normally greater than about 20,684 kPa (3000 psi), and shear strengths of 24,132 kPa (3500) psi are frequently obtained from finished shear ply materials that are formed of the rubber compositions described above.

Other structural properties of the finished rubber composition may include one or more of the following properties, where the temperature is at about 21° C. (70° F.) unless otherwise specified:

a specific gravity in a range of 1.07 to 1.14,
a Shore A hardness in a range of 60 to 75,
a 100 percent modulus in a range from 2413 kPa (350 psi) to 5861 kPa (850 psi),
a tensile strength in a range from 37,921 kPa (5500 psi) to 44,126 kPa (6400 psi),
an elongation percent in a range of 423 to 564, and
a tear resistance in a range of 1896 kPa (275 psi) and 2586 kPa (375 psi).

The precursor and finished rubber composition are, in presently preferred but merely illustrative embodiments of the invention, essentially free of silica, where the term "essentially" is hereby defined to mean free from all but trace elements of silica or as comprising less than 1% silica.

In still further aspects, the invention pertains to a method of making the rubber composition by blending components (a) and (b) into a mixture, and adding a crosslinking agent. Suitable blenders include conventional rubber mixing equipment, such as the BRABENDER and RELIABLE brand mixers. Mixing is preferably performed in a two-pass procedure, with the crosslinker and any cure catalysts or accelerants added in the second pass.

Yet another aspect includes a method of making a shear ply material using the rubber composition and precursor. The aforementioned method of making the rubber composition may be modified to include making a shear ply for use in connecting a skirt to a rocket motor. This method includes the step of obtaining a precursor mixture as described above, adding a curing agent, activating the curing agent to polymerize the mixture, forming a laminate using the mixture; and adapting the laminate for use as a shear ply connecting a skirt with a rocket motor. The step of forming a laminate preferably includes forming a laminate made of the mixture and a fibrous material, such as a graphite fiber/epoxy composite.

This invention will not be described further with reference to the following examples, which should be considered as exemplary, not exhaustive, of the scope of the invention.

EXAMPLES 1–4

The following ingredients shown in Table 1 were purchased from commercial vendors and combined into precursors for use in making structural rubber compositions. The materials were placed in a BRABENDER internal mixer to form 300 gram batch sizes for evaluation.

ZSC 2295™ and Zetpol 2020™ were purchased from Zeon Chemicals of Louisville, Ky. The Zetpol 2020 product contains amine-stabilized butadiene in an amount ranging from 62.5 weight percent to 65.1 weight percent and acrylonitrile ranging from 34.9 weight percent to 37.5 weight percent of the product, where the product is hydrogenated to 91% saturation. Agerite Stalite S was purchased from the B.F. Goodrich Corporation of New York, N.Y. Agerite Stalite S functions as an amine antioxidant. Vanox ZMTI was purchased from the R.T. Vanderbilt Company, Inc. of New York, N.Y. Vanox ZMTI contains zinc 2-percaptotoluolimidazole, which functions as an imidazole antioxidant that is known to act synergistically with Agerite Stalite S to prolong the life of finished rubber products. Vul-Cup 40 KE was purchased from Hercules Incorporated Corporation of Wilmington, Delaware. Vul-Cup 40 KE contains 2,2'-bis(t-butylperoxy)diisopropyl benzene, which is dispersed in a clay carrier to a 40 percent by weight concentration.

The examples were each prepared by a two-pass procedure. In the first pass, all ingredients other than the curative were added to a BRABENDER mixer at 25–40 rpm. This batch was dumped at 93° C. (200° F.). The second pass was performed at the same mixing speed, and dumped at 71° C. (160° F.).

TABLE 1

STRUCTURAL RUBBER FORMULATIONS (Parts By Weight)

| Commercial Product | Example 1 | Example 2 | Example 3 | Example 4 |
|---|---|---|---|---|
| ZSC 2295 | 60.00 | 60.00 | 50.00 | 50.00 |
| Zetpol 2020 | 40.00 | 40.00 | 50.00 | 50.00 |
| Agerite Stalite S | 1.50 | 1.50 | 1.50 | 1.50 |
| Vanox ZMTI | 1.00 | 1.00 | 1.00 | 1.00 |
| Vul-Cup 4OKE | 5.00 | 3.00 | 5.00 | 3.00 |
| Total | 107.50 | 105.50 | 107.50 | 105.50 |

Accordingly, Table 1 shows the weight percentages of ingredients according to each mixture.

The respective mixtures were each subjected to rheological measurements at 100° C. to determine their suitability for use in manufacturing processes, then heated to a temperature of 160° C. (320° F.) for activation of the peroxide curing agent for physical property testing. The results are shown in Table 2.

TABLE 2

RHEOLOGICAL CHARACTERISTICS

| Property | Example 1 | Example 2 | Example 3 | Example 4 |
|---|---|---|---|---|
| Mooney viscosity, ML 1 + 4 at 100° C. (212 F.) | 66.8 | 69.4 | 68.4 | 72.2 |
| The following properties were determined by oscillating disk rheometer, 160° C. | | | | |

TABLE 2-continued

RHEOLOGICAL CHARACTERISTICS

| Property | Example 1 | Example 2 | Example 3 | Example 4 |
|---|---|---|---|---|
| (320° F.), 5-degree arc | | | | |
| ts2,min. | 3.2 | 3.7 | 3.3 | 3.9 |
| ML, in.-lb. | 5.2 | 4.8 | 4.8 | 8.0 |
| MH (after 2 hours), in.-lb. | 60.0 | 47.5 | 52.5 | 45.5 |
| Mc(90), in.-lb. | 54.5 | 43.2 | 47.7 | 41.8 |
| tc (90), min. | 26.1 | 28.4 | 27.1 | 37.5 |

The 300 gram batch rubber formulations from Table 1 were subjected to evaluation for purposes of determining strength and flexibility properties. Table 3 summarizes the physical properties of the rubber formulations.

TABLE 3

PHYSICAL PROPERTIES OF THE STRUCTURAL RUBBERS AFTER THERMAL ACTIVATION OF CURING AGENT AT 160° C.

| Property | Example 1 | Example 2 | Example 3 | Example 4 |
|---|---|---|---|---|
| Specific gravity | 1.1207 | 1.1118 | 1.0938 | 1.0851 |
| Shore A hardness | 71.2 | 67.0 | 66.3 | 63.1 |
| 100 percent modulus, psi | 766 | 527 | 547 | 372 |
| Tensile strength, psi | 6140 | 6100 | 6000 | 5940 |
| Elongation, percent | 423 | 539 | 442 | 564 |
| Tear resistance, psi | 317 | 347 | 296 | 312 |

From these measurements, the rubber that resulted from Example 2 was determined to have the best properties for use in a shear ply layer for rocketry applications. However, all of the rubbers tested demonstrated sufficient properties of flexion and strength for use in these applications.

Testing of solid rubber compositions determined that Example 2 had superior properties of strength, flexibility and adhesion, so a scaled-up batch of Example 2 was produced in a 3000 gram batch size. A two-pass procedure was again used, with mixing speeds of 40 rpm in a RELIABLE brand mixer. Dump temperatures were 104° C. (220° F.) and 68° C. (155° F.) for the first and second passes, respectively.

The scaled-up batch had the following rheological properties and physical properties shown in Tables 4 and 5, respectively.

TABLE 4

PROCESSING CHARACTERISTICS AND CURING PROPERTIES OF THE SCALED UP VERSION OF EXAMPLE 2

| Property | Example 2 (Scale Up) |
|---|---|
| Mooney viscosity, ML 1 + 4 at 100° C. (212° F.) | 65.7 |
| The following properties were determined by oscillating disk rheometer, 160° C. (320° F.), 5-degree arc | |
| ts2, min. | 3.3 |
| ML, in.-lb. | 2.0 |
| MH (after 2 hours), in.-lb. | 49.0 |
| Mc(90), in.-lb. | 44.3 |
| tc(90), min. | 36.0 |

TABLE 5

PHYSICAL PROPERTIES OF THE SCALED UP VERSION OF EXAMPLE 2

| Property | Example 2 (Scale Up) |
|---|---|
| Specific gravity | 1.1058 |
| Shore A hardness | 72.6 |
| 100 percent modulus, psi | 540 |
| Tensile strength psi | 5440 |
| Elongation, percent | 460 |
| Tear resistance, psi | 347 |

Figure 2:
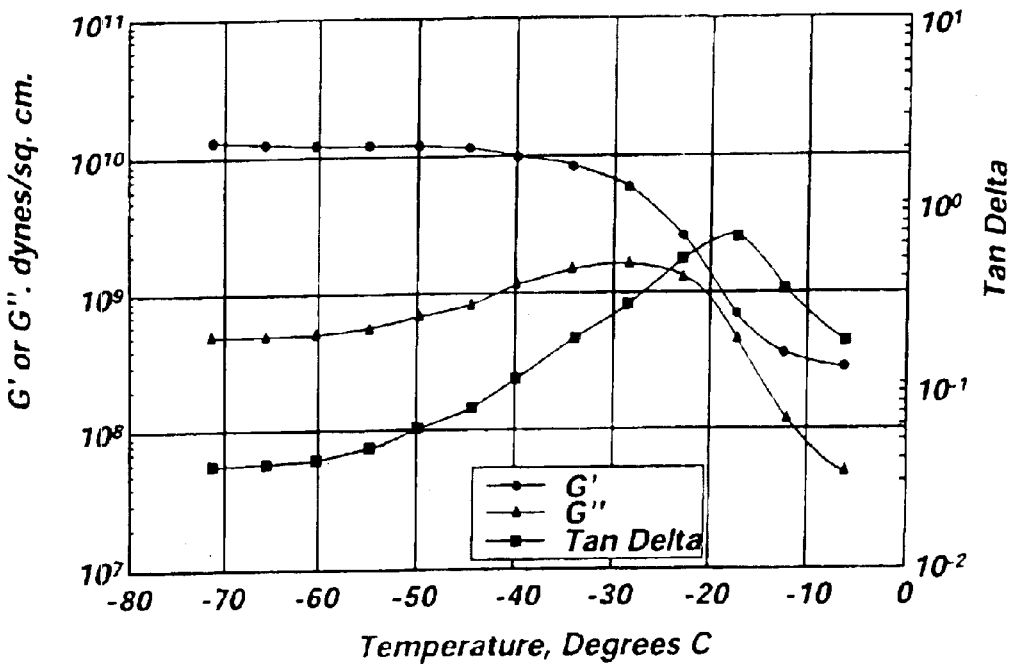
FIG. 2 is a graph showing comparative information with respect to that shown in FIG. 1, but where the data was obtained from the best available prior art material for use in making shear ply layers.

FIG. 1 provides a graph of data that was obtained from the scale up formulation of Example 2 using a Rheometrics Dynamic Spectrometer at a frequency of 1 radian/second and at a strain of 0.2 percent. The temperature at which the peak in the loss modulus G" is understood to approximate the glass transition temperature of an elastomer. The peak occurred at −27.1° C. for Example 2. By way of comparison, a prior art silica filled NBR rubber composition that Thiokol Propulsion currently uses in its shear ply layers provided the results shown in FIG. 2, where the glass transition temperature is estimated at −31.5° C. This data shows that the low temperature performance characteristics of the two rubber compositions are nearly the same with flexion of the prior art silica-filled composition being slightly better in terms of minimum temperature performance. The transition for Example 2 is much steeper, which indicates that Example 2 loses flexion over a narrower temperature range. Furthermore, the storage modulus G' of Example 2 falls well below the storage modulus of the prior art silica-filled composition at −10° C. These measurements show that Example 2, while having improved strength characteristics, has a flexion-temperature performance that is comparable to the prior art formulation.

Figure 3:
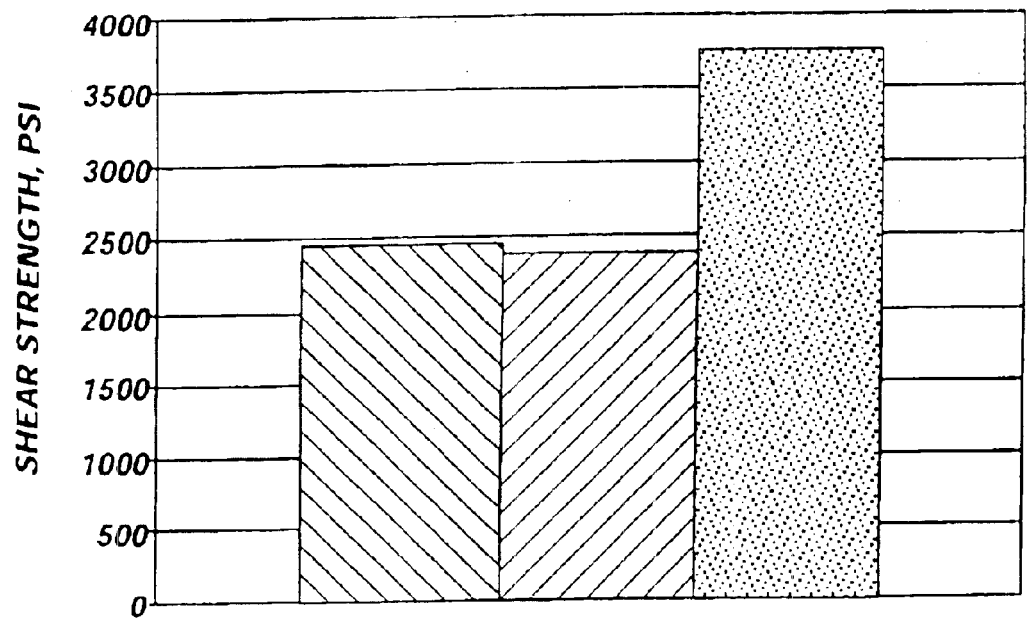
FIG. 3 is a bar graph showing the relative shear strengths of prior art silica filled rubber compositions at 22° C. (72° F.) versus a presently preferred material illustrating the present invention.

According to another aspect of the invention, a precursor as previously described was used to make a shear ply layer. The load bearing structural capacity of a shear ply layer including the solid rubbed composition was tested by curing a rubber sample, laminating the rubber sample to a graphite fiber/epoxy composite, then curing the composite. Similar laminates were made and tested using the prior art silica-filled composition. The samples were tested at 22° C. (72° F.) and 38° C. (100° F.) using a conventional lap shear testing machine at a cross-head rate of 0.051 cm/minute (0.02 inches/minute). FIG. 3 provides a comparison of the shear strength values for samples including an "NBR Control" for the silica-filled composition (left bar on graph), as well as a historical average for numerous silica-filled samples based upon Thiokol Propulsion quality control procedures involving the silica-filled composition (middle bar on graph). These values do not exceed 17,327 kPa (2500 psi) and are compared to 25,924 kPa (3760 psi) for the Example 2 sample (right bar on graph).

Figure 4:
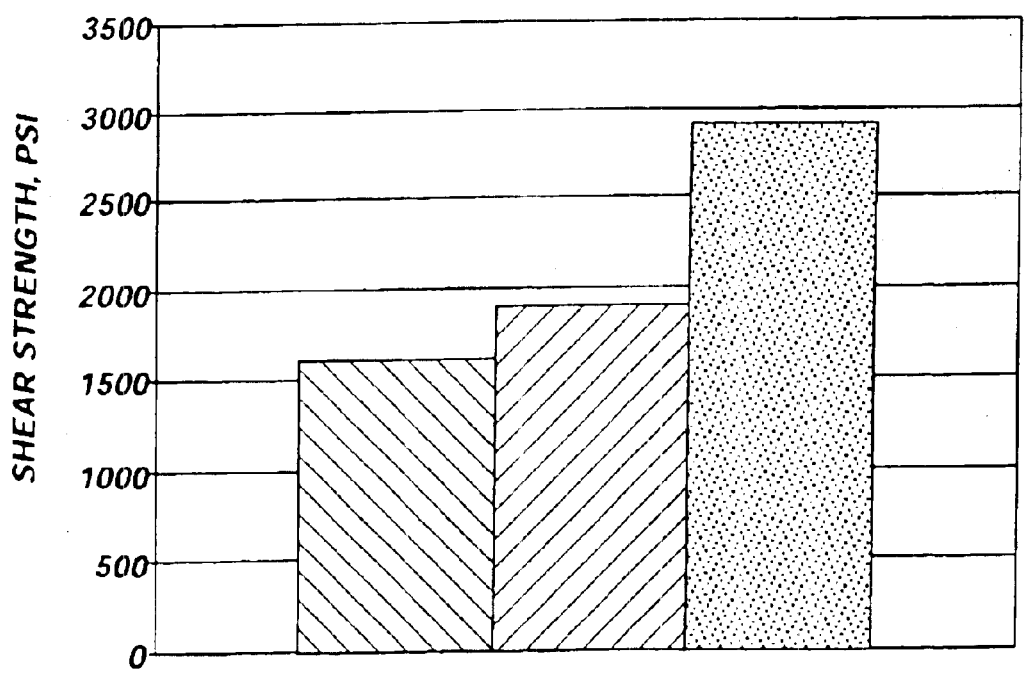
FIG. 4 is a comparative bar graph identical to FIG. 3, but showing data obtained from identical specimens at 38° C. (100° F.).

FIG. 4 provides an identical comparison to that shown in FIG. 3, except the results shown in FIG. 4 were obtained at 38° C. (100° F.). The silica-filled specimens show a shear strength performance reduction to less than 13,789 kPa (2000 psi), while Example 2 continued to demonstrate performance in excess of 17,237 kPa (2500 psi).

The foregoing detailed description of the preferred embodiments of the invention has been provided for the purposes of illustration and description, and is not intended to be exhaustive or to limit the invention to the precise embodiments disclosed. The embodiments were chosen and described in order to best explain the principles of the invention and its practical application, thereby enabling others skilled in the art to understand the invention for various embodiments and with various modifications as are suited to the particular use contemplated. It is intended that the scope of the invention cover various modifications and equivalents included within the spirit and scope of the appended claims.

What is claimed is:

1. A precursor composition having a total weight and curable into a rubber component, the precursor composition comprising:

a first hydrogenated nitrile conjugated-diene copolymer modified by a metal salt unsaturated carboxylic acid ester, wherein the first hydrogenated nitrile conjugated-diene copolymer is derived from a first composition comprising a first ethylenically unsaturated nitrile and a first conjugated diene;

a second hydrogenated nitrile conjugated-diene copolymer derived from a second composition comprising a second ethylenically unsaturated nitrile and a second conjugated diene; and a curing agent, wherein the first hydrogenated nitrile conjugated-diene copolymer and the second hydrogenated nitrile conjugated-diene copolymer are intermixed.

2. The precursor composition according to claim 1, wherein the first and second ethylenically unsaturated nitrites are identical or different, and are each selected to comprise at least one member selected from the group consisting of acrylonitrile and methacrylonitrile.

3. The precursor composition according to claim 1, wherein the first and second ethylenically unsaturated nitrites each comprise acrylonitrile.

4. The precursor composition according to claim 1, wherein the first and second conjugated dienes are identical or different, and are each selected to comprise at least one member selected from the group consisting of butadiene, isoprene, dimethylbutadiene, 1,3-pentadiene, and piperylene.

5. The precursor composition according to claim 1, wherein the first and second conjugated dienes each comprise butadiene.

6. The precursor composition according to claim 1, wherein the metal salt unsaturated carboxylic acid ester is derived from at least one ethylenically unsaturated monocarboxylic acid and at least one member selected from the group consisting of a metal and a metallic compound, and wherein the at least one ethylenically unsaturated monocarboxylic acid comprises at least one member selected from the group consisting of acrylic acid, methacrylic acid, crotonic acid, and 3-butenic acid.

7. The precursor composition according to claim 1, wherein the metal salt unsaturated carboxylic acid ester is derived from at least one ethylenically unsaturated dicarboxylic acid and at least one member selected from the group consisting of a metal and metallic compound, and wherein the at least one ethylenically unsaturated dicarboxylic acid comprises at least one member selected from the group consisting of maleic acid, fumaric acid, and itaconic acid.

8. The precursor composition according to claim 1, wherein the metal salt unsaturated carboxylic acid ester comprises at least one element selected from the group consisting of zinc, magnesium, calcium, and aluminum.

9. The precursor composition according to claim 1, wherein the metal salt unsaturated carboxylic acid ester comprises zinc dimethacrylate.

10. The precursor composition according to claim 1, wherein the curing agent comprises a peroxide curing agent.

11. The precursor composition according to claim 1, wherein the curing agent comprises 2,2'-bis(t-butylperoxy) diisopropyl benzene.

12. The precursor composition according to claim 1, wherein the curing agent is dispersed in a clay carrier.

13. The precursor composition according to claim 1, wherein the precursor composition is essentially free of silica.

14. The precursor composition according to claim 1, wherein (a) and (b) are formulated and present in an effective ratio to provide:

a Mooney viscosity in a range of 60 to 80 determined as ML1+4 at 100° C.;

a TS2 in a range of 3.0 to 4.5 minutes determined by an oscillating disk rheometer at 160° C. over a 5° arc;

an ML in a range of 4.0 to 10.0 in.-lb. determined by an oscillating disk rheometer at 160° C. over a 5° arc;

an MH after 2 hours in a range of 40.0 to 70 in.-lb.;

an Mc(90) in a range of 35 to 60 in.-lb. determined by an oscillating disk rheometer at 160° C. over a 5° arc; and a tc(90) in a range of 20 to 45 minutes determined by an oscillating disk rheometer at 160° C. over a 5° arc.

15. The precursor composition according to claim 1, wherein (a), (b), and (c) are formulated and present in effective ratios to provide, upon curing of the precursor composition into the rubber component, an average shear strength in the rubber component greater than 24,132 kPa when tested at 21° C. by single-lap shear specimens of the rubber component bonded to a graphite/fiber epoxy composite with a crosshead rate of 0.0508 cm/min.

16. The precursor composition according to claim 1, wherein (a), (b), and (c) are formulated and present in effective ratios to provide, upon curing of the precursor composition into the rubber component, an average shear strength in the rubber component greater than 17,237 kPa when tested at 38° C. by single-lap shear specimens of the rubber component bonded to a graphite/fiber epoxy composite with a crosshead rate of 0.0508 cm/min.

17. The precursor composition according to claim 1, wherein (a), (b), and (c) are formulated and present in effective ratios to provide, upon curing of the precursor composition into the rubber component, as determined at 21° C., a specific gravity in a range of 1.07 to 1.14;

a Shore A hardness in a range of 60 to 75;

a 100 percent modulus in a range of 2413 kPa to 5861 kPa;

a tensile strength in a range of 37,921 kPa to 44,126 kPa;

an elongation percent in a range of 400 to 575; and a tear resistance in a range of 1896 kPa to 2586 kPa.

18. The precursor composition according to claim 1, wherein carbon-carbon double bonds in each of the first hydrogenated nitrile conjugated-diene copolymer and the second hydrogenated nitrile conjugated-diene copolymer are hydrogenated to 85% to 95% of saturation.

19. The precursor composition according to claim 1, wherein carbon-carbon double bonds in each of the first hydrogenated nitrile conjugated-diene copolymer and the second hydrogenated nitrile conjugated-diene copolymer are hydrogenated to 90% to 92% of saturation.

20. The rubber component having a total weight, the rubber component being formed from a precursor composition comprising:

a first hydrogenated nitrile conjugated-diene copolymer modified by a metal salt unsaturated carboxylic acid ester, wherein the first hydrogenated nitrile conjugated-diene copolymer is derived from a first composition comprising a first ethylenically unsaturated nitrile and a first conjugated diene;

a second hydrogenated nitrile conjugated-diene copolymer derived from a second composition comprising a second ethylenically unsaturated nitrile and a second conjugated diene; and a curing agent, wherein the first hydrogenated nitrile conjugated-diene copolymer and the second hydrogenated nitrile conjugated-diene copolymer are intermixed.

21. A method of making a rubber component, the method comprising:

providing a first hydrogenated nitrile conjugated-diene copolymer modified with a metal salt unsaturated carboxylic acid ester, wherein the first hydrogenated nitrile conjugated-diene copolymer is derived from a first composition comprising a first ethylenically unsaturated nitrile and a first conjugated diene;

providing a second hydrogenated nitrile conjugated-diene copolymer derived from a second composition comprising a second ethylenically unsaturated nitrile and a second conjugated diene;

blending components provided by providing the first and second hydrogenated nitrile conjugated-diene copolymers to form a blend; and curing the blend with a curing agent to form the rubber component.

* * * * *